United States Patent
Ur et al.

(10) Patent No.: US 12,461,639 B1
(45) Date of Patent: Nov. 4, 2025

(54) SYSTEM AND METHOD FOR INTELLIGENT ACCESSIBLE GRAPHICAL USER INTERFACES

(71) Applicant: Shift4 Technology Limited, Valletta (MT)

(72) Inventors: Shmuel Ur, Shorashim (IL); Michael Holt, Kansas City, MO (US)

(73) Assignee: Shift4 Technology Limited, Valletta (MT)

( * ) Notice: Subject to any disclaimer, the term of this patent is extended or adjusted under 35 U.S.C. 154(b) by 0 days.

(21) Appl. No.: 18/988,014

(22) Filed: Dec. 19, 2024

(51) Int. Cl.
*G06F 3/0481* (2022.01)
*G06V 40/10* (2022.01)

(52) U.S. Cl.
CPC .......... *G06F 3/0481* (2013.01); *G06V 40/103* (2022.01)

(58) Field of Classification Search
CPC ..... G06F 3/0481; G06F 3/048; G06V 40/103; G06V 40/20
See application file for complete search history.

(56) References Cited

U.S. PATENT DOCUMENTS

| | | | |
|---|---|---|---|
| 8,760,426 B1 | 6/2014 | Strand et al. | |
| 2004/0022439 A1 | 2/2004 | Beardsley | |
| 2014/0365341 A1* | 12/2014 | MacLaurin | G06Q 20/3276 705/26.81 |
| 2022/0366131 A1* | 11/2022 | Ekron | G06F 40/109 |
| 2022/0408011 A1* | 12/2022 | Dal Zotto | G06F 3/14 |
| 2024/0296481 A1* | 9/2024 | Hamui | G06V 40/10 |

FOREIGN PATENT DOCUMENTS

WO  WO2013012152  1/2013

OTHER PUBLICATIONS

Marc Pous et al., Enhancing accessibility: mobile to ATM case study, Jan. 1, 2012, IEEE International Workshop on Consumer eHealth Platforms, pp. 404-408 (Year: 2012).*
Dhruva Raythatha et al., An AR-Based Indoor Navigation System with Improved Accessibility, Dec. 6, 2024, International Conference on System Modeling & Advancement in Research Trends, pp. 576-584 (Year: 2024).*
ResearchGate, "Toward accessible self-service kiosks through intelligent user interfaces," Dec. 2010, available at: https://www.researchgate.net/publication/220141775_Toward_accessible_self-service_kiosks_through_intelligent_user_interfaces.

(Continued)

*Primary Examiner* — Tam T Tran
(74) *Attorney, Agent, or Firm* — PEARL COHEN ZEDEK LATZER BARATZ LLP

(57) ABSTRACT

A system and method for arranging computerized graphical elements on a user interface, including: detecting attributes of a user in visual data (e.g., using machine learning based object and/or movement detection techniques), and arranging graphical elements within a graphical user interface (GUI) based on the detected attributes. In some embodiments, arranging graphical elements may include determining a size and/or a location within the GUI for graphical elements in order to accommodate accessibility needs of the user, including, e.g., height, motor control, dominant hand, whether the user is in a wheelchair, and the like. In some embodiments, arranging graphical elements may be performed without displacing a display, screen, or display presenting the GUI.

20 Claims, 11 Drawing Sheets

(56) References Cited

OTHER PUBLICATIONS

Github, "Height Detection," Zamal Ali, available at: https://github.com/zamalall/Height-Detection, accessed Jan. 6, 2025.

National Center for Biotechnology Information (NCBI), "Remote Evaluation of Parkinson's Disease Using a Conventional Webcam and Artificial Intelligence ," Dec. 23, 2021, available at: https://www.ncbi.nlm.nih.gov/pmc/articles/PMC8733479/.

ResearchGate, "Parkinson's disease assessment based on gait analysis using an innovative RGB-D camera system," Aug. 2014, available at: https://www.researchgate.net/publication/270658933_Parkinson's_disease_assessment_based_on_gait_analysis_using_an_innovative_RGB-D_camera_system.

Visage Technologies, "Age Detection," available at: https://visagetechnologies.com/age-detection/, accessed Jan. 6, 2025.

École polytechnique fédérale de Lausanne (EPFL), "A Virtual Keyboard Based onTrue-3D Optical Ranging," available at: https://infoscience.epfl.ch/server/api/core/bitstreams/0123d6b6-38af-40d4-bf7a-ec2384309319/content, accessed Jan. 6, 2025.

* cited by examiner

SYSTEM AND METHOD FOR INTELLIGENT ACCESSIBLE GRAPHICAL USER INTERFACES

FIELD OF THE INVENTION

The present invention relates to intelligent, automatically-adjustable graphical user interfaces (GUIs).

BACKGROUND OF THE INVENTION

As screen technology (such as, e.g., touch screens) becomes more integral to everyday life (including, e.g., making orders in restaurants, booking an appointment in government office, and the like) there is a growing need for intelligent graphical user interfaces (GUIs) or kiosks to accommodate people with disabilities. It would be beneficial to design such systems with accessibility in mind, providing accessibility features to ensure that individuals with visual, auditory, motor, or cognitive impairments may interact with them effectively. Different user needs may require different GUI features such as, e.g., larger text, simplified navigation between menus, alternative input methods, and the like. Intelligent, accessible GUIs may promote inclusivity for individuals with disabilities and allow them to access essential services independently and seamlessly. The need to accommodate or work with disabled as well as tall or short people or users having different features and needs poses a challenge to standard touch screens and kiosks.

SUMMARY

Embodiments of the invention may provide a system and method for arranging computerized graphical elements on a user interface. Using one or more computer processors, some embodiments may detect attributes of a user in visual data (e.g., using machine learning based object and/or movement detection techniques), and may arrange graphical elements within a graphical user interface (GUI) based on the detected attributes.

In some embodiments, arranging graphical elements may include determining a size and/or a location within the GUI for graphical elements—for example, to accommodate accessibility needs of the user, including, e.g., height, motor control, dominant hand, whether the user is in a wheelchair, quality of vision, and the like.

In some embodiments, arranging graphical elements may be performed without displacing a display, screen, or display presenting the GUI.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention may allow arranging or positioning graphical elements in a graphical user interface (GUI) to accommodate different users' needs or preferences. For example, some embodiments may adjust the height of a GUI or window within a touch screen or kiosk, and/or arrange the size and/or positioning of buttons within the GUI, window, or touch screen—based on user attributes such as the user's height, fine motor capabilities, eyesight capabilities, and the like.

In some embodiments, user attributes or features may be detected, measured, or determined using image processing and machine learning techniques for object detection, and the arranging of graphical elements or items may be performed using logical flows and/or machine learning techniques mapping or associating user attributes or features to arrangement or positioning parameters.

Some embodiments may arrange graphical elements or items within a GUI or window to accommodate users' needs without moving or displacing the physical screen or display component on which the GUI is displayed.

Figure 1:
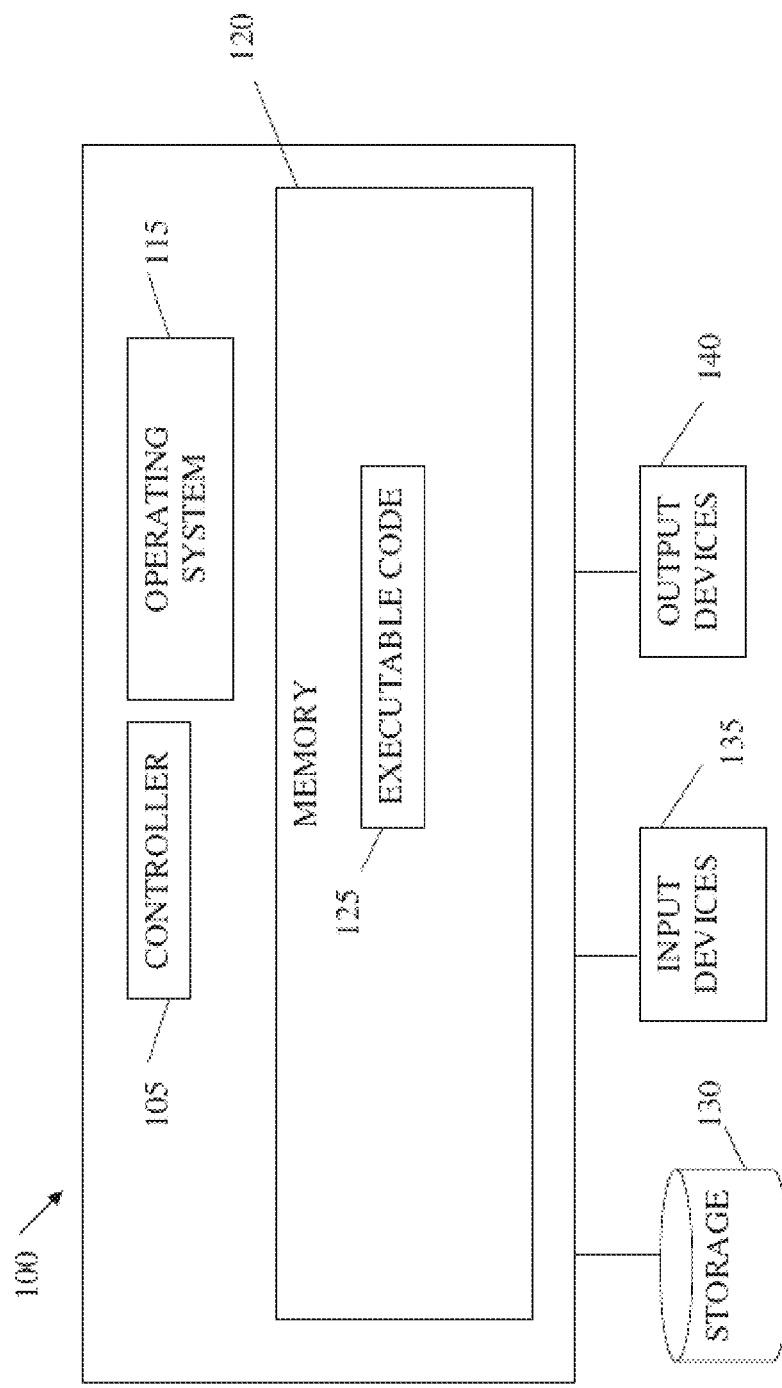
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in storage 130 and may be loaded from storage 130 into memory 120 where it may be processed by controller 105.

Input devices 135 may be or may include a mouse, a keyboard, a touch screen (e.g. a GUI) or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

As used herein, "arranging" graphical items or elements as used herein may refer to, e.g., sizing, resizing, adding elements, omitting elements, positioning elements within a GUI or display portion, positioning a GUI on or within a display or screen, and the like.

As used herein "visual data" may refer to, e.g., image data, moving image, video or video frame data, light detection and ranging (LiDAR), and/or other sensor outputs and/or detected data.

In many places and/or contexts, such as for example, in restaurants, health clinics, lines or queues in airports, and various places involving a waiting queue, visual "kiosks" or displays, as well as user interfaces, or graphical user interfaces (GUIs) may be installed and used.

Kiosks or GUIs as used herein may be or may refer to, e.g., a touch screen or user interface with which the user may send or transmit a computerized request or command to a computer system. Example requests or commands sent or transmitted by the user may include, for example, placing an order, reserving a spot in a queue, asking for assistance by an agent/representative, and the like. It is noted that a GUI as used herein generally refers to a graphical or to a virtual window within a physical screen or display, but can also refer to the physical screen or display itself.

Some embodiments may include a kiosk device or display device including or displaying a GUI including a plurality of graphical items or elements. Some embodiments may provide and/or use placement or arrangement algorithms to place or arrange graphical elements within the GUI or display.

As used herein, graphical items or elements may refer to as visual components displayed in a user interface or GUI and, e.g., on a screen or display (such as, e.g., touch screen, or kiosk) that allow user interaction or provide information. These may include icons, buttons, menus, text fields, sliders, and other interactive elements which may enable a user to provide input to a computer system. Graphical items or element may be displayed on the screen and configured to provide input to a computer system and to respond to touch, click, or gesture inputs, with corresponding computer actions or operations (such as for example processing an order and/or printing an order number for the user, and the like) which may be processed by the system.

Movement or motion data as used herein may refer to information capturing the movement of an object over time within a sequence of images or frames. This data may include parameters such as the object's position, velocity, acceleration, and trajectory changes relative to the camera's viewpoint and/or to a reference image. Movement or motion data may, e.g., be determined or derived from analyzing differences between consecutive images or frames, or between an image and a reference point or reference image, for example using techniques such as optical flow, background subtraction, and/or additional machine learning algorithms and techniques. Some embodiments may process movement data to track an object's path, predict future movements by an object or user, and the like, allowing for accurate identification and interaction with dynamic objects and/or users (which may include, e.g., detecting or measuring attributes or features of a user in visual data, image data, video data, and the like), and for dynamically arranging graphical items or elements based on detected or determined movement or motion data.

While some embodiments of the invention are described herein with regard to touch screens, where, for example, a user may interact with a GUI and/or its constituent elements by touching the screen—some embodiments of the invention may include or relate to other user interface or GUI types, such as for example GUIs with which a user may interact by pointing at graphical elements or items (which may for example use a camera to detect movements and pointing directions by the user).

For example, some embodiments may enable and detect user interaction with virtual keys or GUI elements by, e.g., using a combination of a depth-sensing camera and a display, which may be or may include, e.g., a projector or screen. The depth-sensing camera may detect or capture 3D information about the user's hand or finger position relative to the display surface (for example using object and/or hand detection techniques), which may be used for detecting or measuring attributes or features of a user in visual data.

When a user points to a graphical element (and for example presses a virtual key), some embodiments may track the movement and depth/distance of the user's finger from the camera and/or display, and may identify or determine when it is within a predefined interaction zone or distance near the display surface (such as for example within 50 centimeters from the display) and a location or direction where the user's index finger may be pointing (e.g., using hand detection algorithms). By correlating the depth data with the projected or screened graphical interface, some embodiments may determine which virtual element the user is pointing to or pressing. This may allow for precise interaction with projected or virtual GUI elements without requiring physical contact or touch by the user.

Additional or alternative user interfaces or GUIs may be used in different embodiments.

Some GUIs and kiosks lack desirable accessibility features: for example, graphical elements and/or buttons within a GUI or kiosk may be placed at a height appropriate for an adult (and may be easily pressed or pushed, e.g., by a person above 1.5 meters in height)—which may be inappropriate, inconvenient, or difficult to use for a child, or for disabled people (e.g., a person in or restricted to a wheelchair). In another example, some graphical elements and/or buttons within a GUI or kiosk may prove difficult to use for a user or person having motor control issues (pressing small buttons may prove difficult, for instance, for a person coping with Parkinson's disease related tremors).

Some embodiments of the invention may allow to dynamically and automatically place, arrange or rearrange graphical elements or GUI elements to accommodate different users having, for example, different accessibility needs, e.g., in real time (such as for example a fraction of a second, or, e.g., 0.20 seconds from detecting a user approaching the kiosk). Some embodiments may place, arrange or rearrange graphical elements for example based on detecting or measuring various attributes or features of the user prior to or while using the GUI. Some embodiments may enable to meet regulatory requirements relating to accessibility in venues or contexts where kiosks or GUIs may be used or utilized.

In some embodiments, attributes describe an interaction of the user with the GUI. For example, detected or measured attributes or features of a user, such as for example height, dominant hand, and motor capabilities, can directly influence or describe how the user interacts or may interact with a display or GUI of a system according to some embodiments of the invention—which may tailor the GUI and/or place or arrange graphical items or elements within the GUI for accessibility and ease of use based on attributes detected for a given user. For example, a GUI for a taller user may shift upwards to match the user's natural line of sight, while a shorter user's GUI may be lowered. Such a shift or movement may be movement of GUI elements or images on-screen, without movement of the physical screen, display or monitor. (In this context, "moving" or "movement" of GUI elements as used herein may refer to determining a placement and/or size for GUI elements and/or placing and/or sizing the elements according to the determined locations and/or sizes, which may be performed dynamically and result in different placements and sizes to accommodate different users' needs, and may be performed digitally by moving items on a display without moving the physical display or monitor.) In some embodiments, if the system identifies the user's dominant hand (e.g., right-handed), interactive elements like buttons or sliders may be placed (e.g. moved on-screen) closer to the right side of the screen for easier access. For users with limited motor capabilities, the size of clickable or touchable elements may be increased and spaced out to accommodate slower or less precise movements, ensuring more comfortable and effective interaction with the GUI. This dynamic placement or arrangement may improve usability based on individual needs.

In some embodiments, the arranging of the one or more graphical elements is performed without displacing a physical, hardware display element comprising the GUI. For example, while some embodiments may provide desirable accessibility features, for example by moving or displacing a display element such as a physical screen, monitor or display presenting the GUI, or by moving or displacing a physical component or housing on which the display may be mounted—some embodiments of the invention may provide accessibility features by placing, arranging or rearranging graphical elements or GUI elements within the display or GUI and without moving or displacing physical components, without moving elements outside the GUI, or by moving, placing, arranging, or displacing only graphical elements. In some embodiments, this may be achieved by arranging or rearranging graphical items and/or elements within a GUI (which may be required to have desirable dimensions, such as, e.g., a length or at least 60 centimeters in a vertical direction or along a vertical axis) based on detected or identified user attributes—such that, e.g., the height or location of graphical elements may be determined or altered without having to displace or move the physical hardware element (e.g., screen or kiosk) displaying the GUI and/or graphical elements.

By providing desirable accessibility features without moving or displacing physical components, some embodiments of the invention may improve technology for example by being more energy efficient and economical (e.g., by not using energy for physically moving mechanical components and only using energy for displaying elements, items, or icons on a GUI or display fixed in one place). Some embodiments may improve technology by requiring less technical maintenance, or by not requiring mechanical maintenance that may be associated or required for physically moving mechanical component. Embodiments may allow for more flexible adaptation of a GUI display than is possible with physical movement of a monitor or screen itself. Dynamically arranging graphical elements according to some embodiments of the invention may improve display technology and provide faster and more economical (e.g., in terms of power consumption) touch screens or kiosk systems, e.g., compared to existing system relying on mechanical displacements of physical components of a screen, stand, and the like.

Some example user attributes or accessibility attributes that may be determined, detected, and used in some embodiments may include, for example, a user's height, and/or a user's dominant hand, and/or whether a user is in a wheelchair, and/or a user's motor impairment, and/or a user's age, and/or a position for the user's touch on the kiosk or GUI. Some embodiments may determine user attributes or accessibility attributes using visual data analysis and/or object detection and monitoring techniques using image and/or video data.

Figure 2:
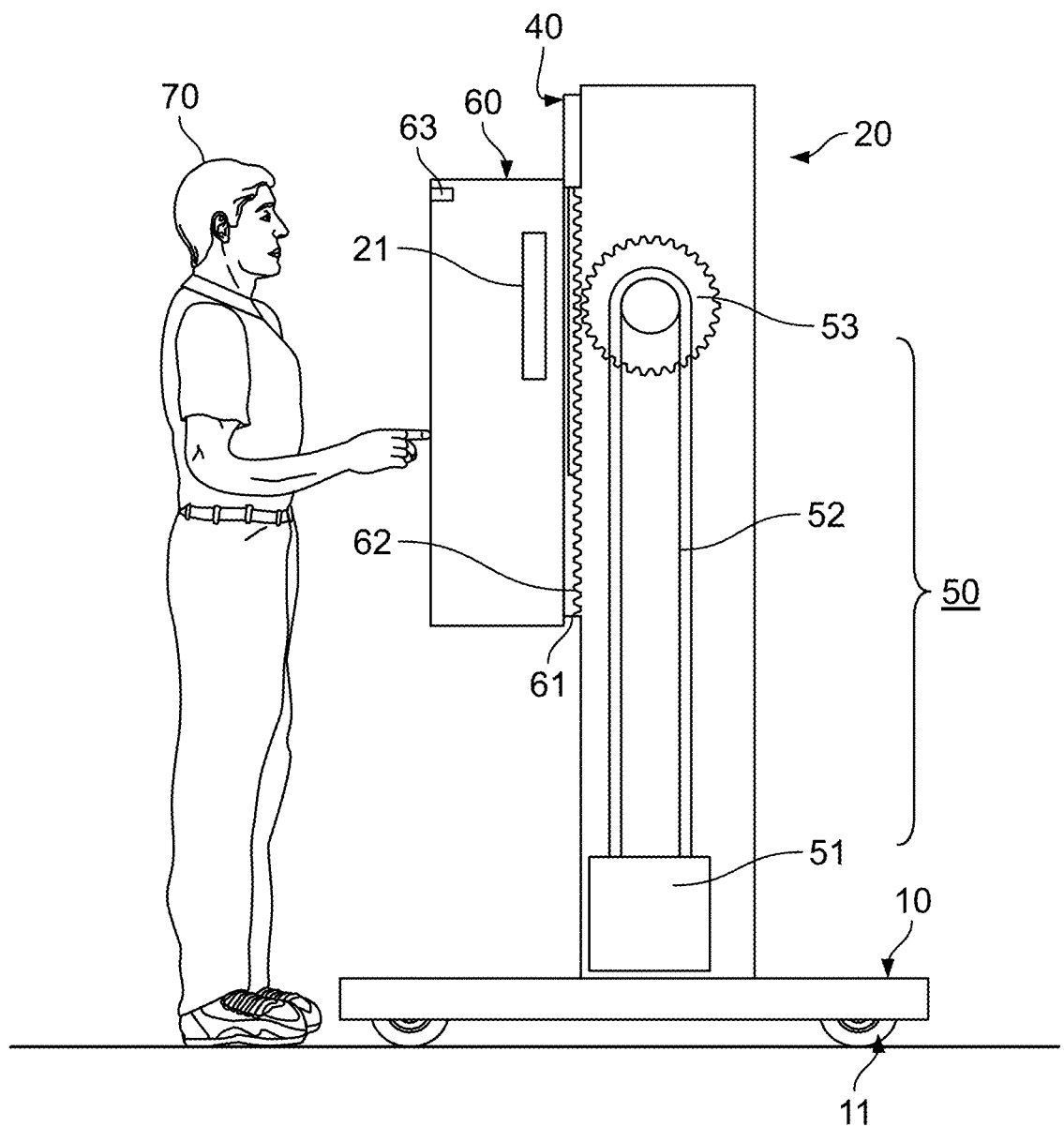
FIG. 2 shows an example kiosk and graphical user interface according to some embodiments of the invention.

FIG. 2 shows an example kiosk and graphical user interface according to some embodiments of the invention.

A mounting surface or table 10 may be a base for installing a display, kiosk, or touch screen monitor 60, and may include a moving roller 11 for ease of movement and/or arrangement and/or placement. In some embodiments, a supporting surface or wall 20 (also referred to as "support")

may be coupled in the vertical direction to the upper portion of the mounting surface or table 10 so that touch screen monitor, display, or kiosk 60 may for example be placed and/or lifted and/or elevated vertically (e.g., to accommodate the height of a user).

Object detection sensor or camera 63 may for example be placed or installed, for example, in an upper portion of kiosk 60 or of support 20, and may be used to detect the user's attributes and/or movement (such as, e.g., the user approaching display or screen monitor 60). A control unit 21 (which may for example be or may include a computer system such as, e.g., system 100) may be used for processing and/or coordinating detection operations by sensor 63 and/or the placing or arranging of elements or components such as for example the lifting of the touch screen monitor 60, and/or the arranging of graphical elements within display or screen monitor 60.

In some embodiments, a first rail 40 may be configured or may be installed in the vertical direction on an upper front of the support 20 and may be used, e.g., for lifting or displacing touch screen monitor 60 (While some embodiments operate without moving a monitor or screen, or kiosk, other embodiments may combine moving GUI elements on a screen with movement of the screen or kiosk itself.). A vertical operation unit 50 may be operated by control unit 21, e.g., in accordance with or based on detection operations by sensor 63. Vertical operation unit 50 may include, e.g., a motor unit 51 which may be installed on the lower portion of support 20. An upper portion of support 20 may include an operating gear 53 connected to motor 51, for example by a chain 52.

Touch screen monitor 60 may be operated by user 70, for example to obtain information, place orders, send requests or commands, input information to a computer system, and the like. Object detection sensor or camera 63 may detect, for example, a user's approach to screen 60.

In some embodiments, a second rail 61 and rack gear 62 may be placed on the rear surface of display or touch screen monitor 60. Second rail 61 may be found, e.g., in parallel to the first rail 40 installed on support 20, for example to allow touch screen monitor 60 to be slide-coupled to the first rail 40. Rack gear 62 may be coupled to operating gear 53 by vertical operation unit 50 to perform a lifting or lowering operation of touch screen monitor 60. Gears 62 and 53 may include a plurality of blades such for example saw-shaped gear blades, although other blade shapes may be used in different embodiments.

In some embodiments, motor 51 and/or sensor or camera 63 and/or display, GUI or screen 60 may be used to perform operations or processes executed or coordinated by control unit 21 such as, e.g., to place, arrange or rearrange GUI elements or items within screen 60, to activate and/or collect data from sensor or camera 63, to detect attributes and/or movement by user 70, to rotate and operate operating gear 53, e.g., using chain 52 (where, e.g., touch screen monitor 60 may be displaced or moved using operating gear 53 and rack gear 62 to be lifted), and the like.

In some embodiments, arrangements or rearrangements of GUI elements and/or lifting operations of the display or touch screen monitor 60 may be automatically performed, e.g., according to or based on detections by sensor or camera 63 (such as, e.g., according to a detected height of the user), In some embodiments, a lower surface of the display or touch screen monitor 60 may include a conventional speaker or sound output unit. According to some embodiments, a plurality of sensors or cameras (such as, e.g., sensor or camera 63) may be installed or placed in different locations relative to touch screen monitor 60, such as, e.g., on an upper/lower/side portion of the touch screen monitor 60, above/below display or touch screen monitor 60, and the like.

According to some embodiments (such as for example shown in FIG. 8) the monitor, screen or display may be fixed and not moveable (and for example not include a vertical operation unit and/or rails and/or gears as described with reference to FIG. 2).

A touch screen or kiosk according to some embodiments may be oriented vertical (e.g., for a screen having a longer dimension perpendicular to a shorter dimension, the longer dimension may be perpendicular to the ground or floor) to the floor and may be long enough or of a length accessible by both standing users and users in a wheelchair, short users and the like. A touch screen according to some embodiments may be tall or long enough, and may reach or start low enough, to serve people or users of all sizes (see, e.g., illustrated example in FIG. 8). For example, a touch screen or kiosk according to some embodiments may be 60 to 140 centimeters in length, although other dimensions may be used in different embodiments.

Additional or alternative kiosk components or units may be included and used in different embodiments of the invention.

In some embodiments, a sensor such as, e.g., a camera may be used to detect a person coming towards or approaching the kiosk (for example based on reference images and/or depth sensing or calculations). It may then be used to detect the person's or user's height, as well as additional attributes or properties such as for example if the user is in a wheelchair, if the user has fine motor control conditions or issues (as may be caused, e.g., by Parkinson's disease). Some embodiments may use a simple camera as a sensor to produce or generate sensor data based on which user attributes, properties, or preferences may be detected—and based on which graphical elements or items may be arranged or rearranged.

A "simple camera" as user herein may refer to, for example a standard 2D imaging camera, which may capture visible light images and may be used for object recognition tasks and operations. Some nonlimiting examples include:
  Webcams that may capture live video and images, often used for detecting user presence or hand movements. Nonlimiting example model: Microsoft LifeCam HD-3000.
  Closed circuit television (CCTV) cameras, which may be standard surveillance cameras that can be used in kiosks, e.g., to monitor user activity and detect interactions with the screen or environment. Nonlimiting example model: Dahua HAC-HFW1200R.
  USB Cameras, which may be plug-and-play cameras with moderate resolution that may be used for detecting objects or user gestures in front of a kiosk. Nonlimiting example model: Raspberry Pi Camera Module V2.

Some embodiments of the invention may include cameras having depth sensing or infrared capabilities, or other technical features. Different sensors or combinations of sensors may be used in different embodiments.

In some embodiments of the invention, a camera may be used to capture images or video of an object (such as for example a person or user of a kiosk), and images/videos may be processed by the system (e.g., using a processing unit) to detect or recognize object or user attributes or characteristics, e.g., using various object detection procedures and algorithms.

Figure 3:
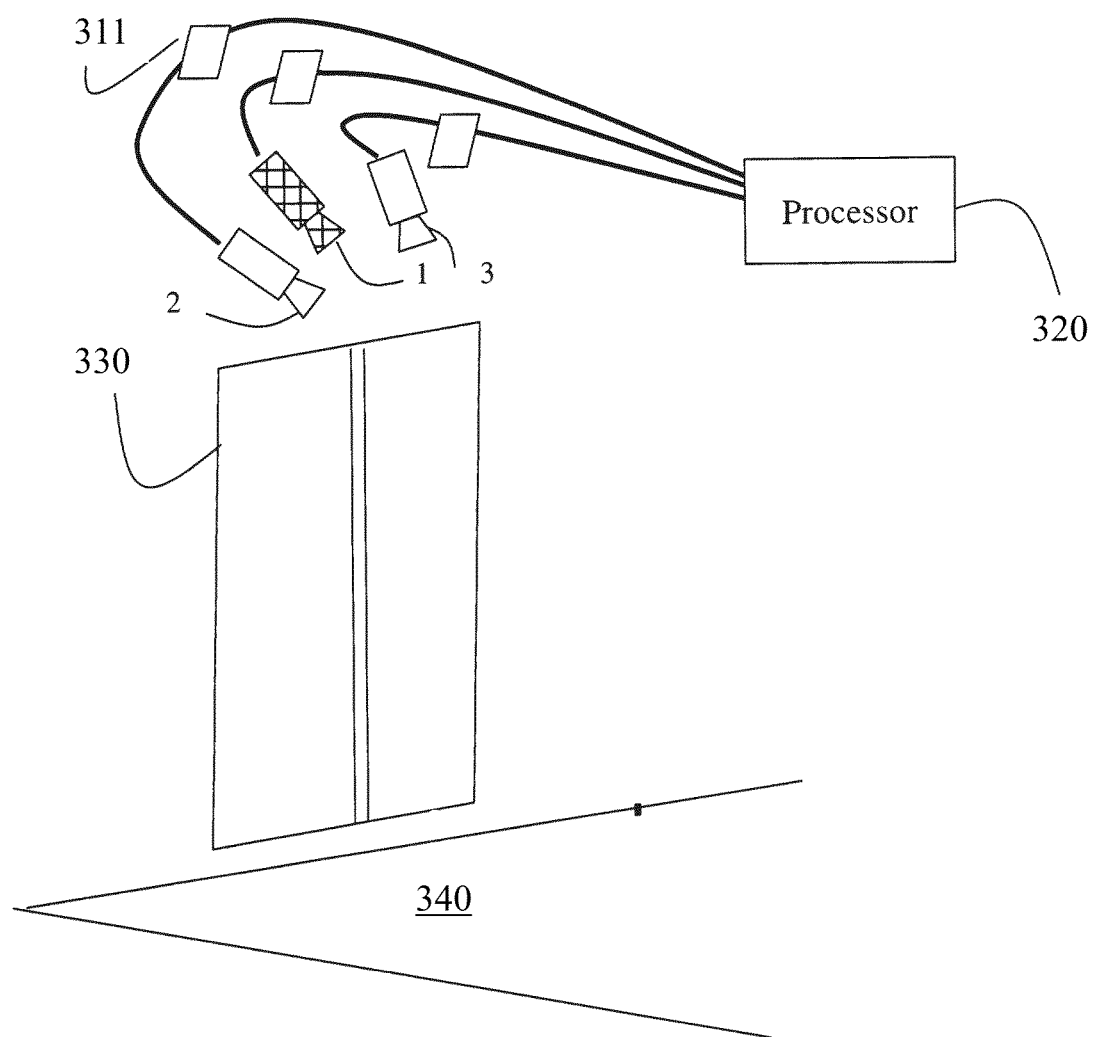
FIG. 3 shows an example multi camera system for object detection according to some embodiments of the invention.

FIG. 3 shows an example multi camera system for object detection according to some embodiments of the invention.

According to some embodiments, an example system may include multiple cameras 1, 2 and 3 having their outputs—which may include visual data such as for example image and video data—connected to and/or collected by a processing unit or controller 320 (such as, e.g., shown in FIG. 1) configured to perform computer vision and/or object detection processing. In some embodiments, visual data such as, e.g., images (311) and videos from cameras 1-3 may be collected and stored in computer memory and/or storage (see, e.g., FIG. 1), or in a storage unit of a cloud platform (such as, e.g., an S3 unit provided by Amazon Web Services) and may be used and/or processed using object detection techniques (see nonlimiting examples herein). Cameras 1-3 may be mounted above touch screen or kiosk 330 so that visual data or images 311 acquired by the cameras may describe a scene or shot 340 in front of the kiosk or screen. It should be noted that the cameras may be mounted in different locations proximate to the scene and, e.g., using different angles to create different perspectives and to capture different shots and/or relevant regions in space. Different cameras according to some embodiments may use gray-scale or color sensors.

Figure 4:
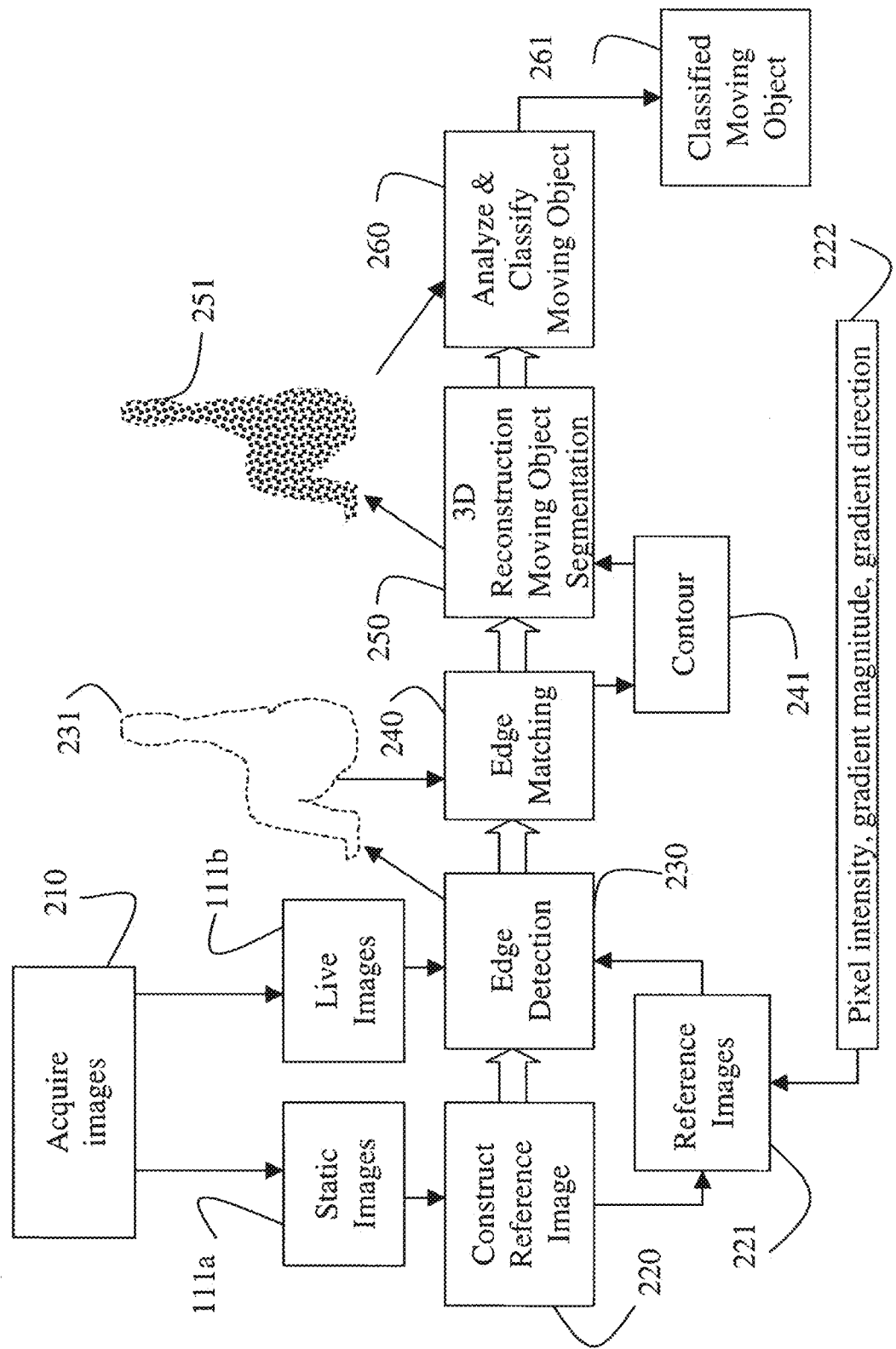
FIG. 4 shows an example object detection process according to some embodiments of the invention.

FIG. 4 shows an example object detection process according to some embodiments of the invention.

In some embodiments, visual data such as, e.g., static images 111*a* and/or video or live images 111*b* may be captured or acquired 210 by a given camera or cameras. Images 111*a*-*b* may be, e.g., in gray-scale or in color. In a pre-processing step, images 111*a*-*b* may be resampled from a set or a broader set of captured images and/or refined, e.g., to remove radial distortion or noise. Preprocessed images or reference images 221 may for example be generated or constructed 220 from static images 111*a* taken by the cameras, e.g., to include desired or normalized pixel attributes or values such as, e.g., intensity values, and/or gradient magnitudes or direction (e.g., for a scene or background expected to later include an object that is to be detected)—based on which further analyses and detections of objects in images may be performed.

In some embodiments, reference data points or images 221 may be constructed from two or more static images. This operation may be performed, for example, during the preprocessing step and using images where it is known or assumed that there are no moving objects in the scene, or that there are no objects in the scene that may subsequently be removed from a given camera's view. Reference images may be constructed or updated on a periodic basis (e.g., once in 5 minutes) to prevent detection errors (that may be caused by changes in the scene or by the presence of objects in the camera's view). In some embodiments, for each pixel in the reference point or image, reference pixel values 222 may be determined and used, e.g., in constructing reference points or images 221, e.g., from static images 111*a*—which may include for example calculating statistical values such as, e.g., a mean and variance of the pixel's intensity, a mean and variance of the pixel's gradient magnitude, and a mean and variance of the pixel's gradient direction. If the images are taken using a color camera, values or statistical RGB values may be used.

The reference image and/or values may be used to detect objects and/or their attributes based on differences between reference values and values of an image different from the reference image (and describing the same scene shown in the reference image). For example, preprocessed images or reference images 221 may be overlayed on, and/or compared or applied to XX live images or videos 111*b* to detect edges or reference points 230 of an object in the scene. Reference point or edge identification or matching 240 may be used to identify or determine a plurality of edges or edge chains 231 that may be included in a contour or part of a contour 241 or that may have, e.g., similar pixel or color value within a given image or a plurality of images. Three-dimensional reconstruction 250 may be applied to contour 241, e.g., to segment a 3D object 251. The segmenting may identify only the pixels (set of data points or reference points in the image) that may be associated with an object such as, e.g., a moving object not present in a given reference point or image. Based on coordinated information for the relevant pixels within the image, the set of detected edges or data points may reveal the shape of a given 3D object.

Some embodiments of the invention may perform object and/or point or edge detection 230 based on background change or color differences between pixels describing or showing an object (e.g., a person or user) and pixels describing or showing its background.

A 3D object 251 may be analyzed 260 for example for determining a classification 261 of the object, e.g., the object is an ambulatory person, a wheelchair user, and the like, which may be used or determined as attributes of a user (for example, a wheelchair being detected or identified may be considered an attribute of a user which may be stored or be described in a variable such as, e.g., 'Wheelchair?'=YES; if not wheelchair is detected, a default value for the variable may be 'Wheelchair?'=NO). Some embodiments may accordingly detect objects such as, e.g., the presence of a wheelchair, and determine if a user is in a wheelchair, using image or video frame data and/or using object classification techniques which may include, e.g., machine learning based methods and models (see nonlimiting examples herein).

In some embodiments, attributes may include, e.g., wheelchair usage or whether the user is in a wheelchair. For example, according to some embodiments, classifications for objects, such as identifying whether a 3D object is an ambulatory person or a wheelchair user (or determining whether a user is in a wheelchair), as well as other types of objects, may be obtained using machine learning models, for example by training these models on comprehensive datasets of labeled 3D object data. For example, a neural network (such as, e.g., a convolutional neural network, or CNN) may be trained using 3D point clouds or depth maps from depth-sensing cameras or LiDAR. The model may learn or extract features (such as, e.g., height, movement patterns, or geometrical shape) that may distinguish different classes of objects. During operation, some embodiments may capture 3D data of a new object, may process it using the trained model, and may output an object classification. For instance, a machine learning model may detect patterns like a standing posture for an ambulatory person or the specific geometry and movement of a wheelchair user. Some nonlimiting example models such as, e.g., the PointNet or 3D CNNs models, may be used in some embodiments for classifying 3D objects, for example in real time (e.g., within seconds from the capturing of images or live images or videos by a corresponding camera).

Some embodiments of the invention may include detecting one or more attributes of a user in visual data. Various nonlimiting example detectable attributes are considered herein, including, e.g., a height of the user, a motor ability of the user, a dominant hand of the user, and whether the user is in a wheelchair. Different attributes may be considered in different embodiments.

Figure 5:
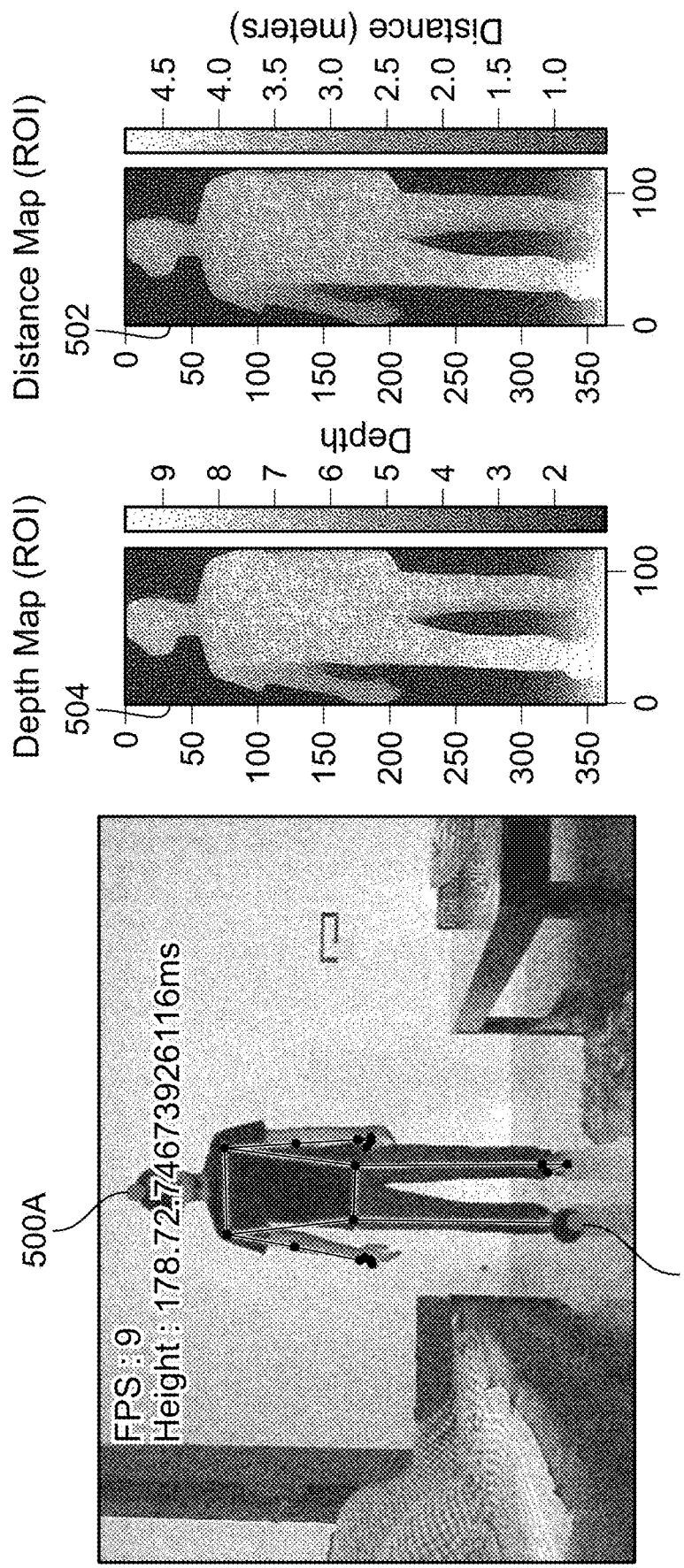
FIG. 5 shows an example of height detection according to some embodiments of the invention.

FIG. 5 shows an example of height detection according to some embodiments of the invention.

Some embodiments may detect object dimensions such as, e.g., the height of a user using visual data such as, e.g., image or video frame data. For instance, in some embodiments, the height or boundaries of an object such as, e.g., a person or user may be estimated by identifying key reference objects or points 500A-B in an image, such as the top of the head 500A or the user and/or the feet 500B or the user within the image.

In some embodiments of the invention, height and/or depth detection may be performed using pixel-based measurements, where the system may calculate a distance between the detected edges or points (such as e.g. 500A-B, or the top of the head and bottom of the feet of a user) and/or calculate depth of points or parts of an image, e.g., in pixel units. For example, distance and/or depth calculations may be performed using a distance map 502 and/or a depth map 504—in which the distance or depth or a user and/or parts of the image may be determine or calculated by comparing pixel values (for example a color value of each pixel) with adjacent pixels in the image. Based on pixel value differences, some embodiments may detect the boundaries of an object such as a user approaching the kiosk or camera, and the environment surrounding the object or user. In some embodiments, height detection or calculation may be performed using a photo or video where the user may be at or within a predetermined distance from the camera (for example within 0.5 meters away from the camera or kiosk).

In some embodiments, a machine learning model (such as for example a deep or convolutional neural network) may be used in image or pixel based height and/or depth measurement. For example, a model may be trained on labeled datasets of pixelated images containing known heights of objects or users, enabling it to predict the height of new objects based on various features or detected attributes such as object size, position, and environmental context.

This pixel height/depth or pixel based results may be converted into a real-world height/depth, for example using either known reference objects or predefined camera calibration parameters. The camera may capture, e.g., static images or a continuous video stream, allowing for real-time height measurement. The system may detect points or edges in real time, continuously updating the calculated height as the object moves or changes position.

In some embodiments of the invention, image and/or video data collection may be performed using a computer webcam with an image resolution of, for example, 640×426 pixels and at a frame rate of 30 frames per second (fps). Additional or alternative cameras and/or settings may be used in different embodiments.

A detected height of a user may be used as an attribute of the user and, for example, be stored as a variable such as, e.g., 'user_height'=X (where X is a floating point number designating the user's height in centimeters).

Figure 6:
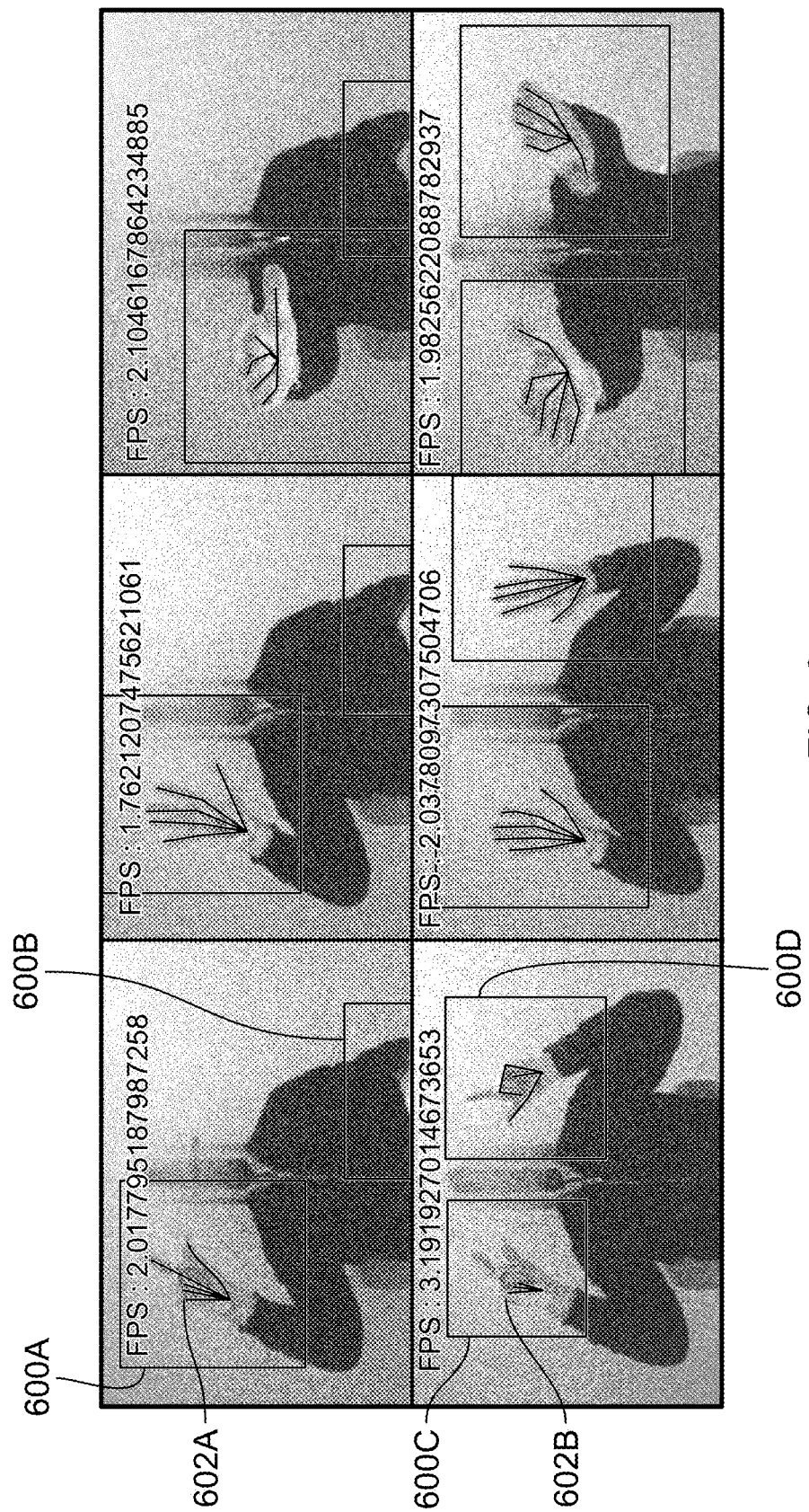
FIG. 6 shows an example hand detection process according to some embodiments of the invention.

FIG. 6 shows an example hand detection process according to some embodiments of the invention.

Some embodiments may detect hands (e.g., of a user) in visual data such as, e.g., image or video data. For example, in some embodiments, images or video frames may be analyzed using a neural network such as for example Single Shot MultiBox Detector (SSD) network, which may for example be trained on an appropriate, comprehensive dataset such as, e.g., the EgoHands dataset, to detect hands in real time. The SSD may output bounding boxes for each detected hand with a probability score for each box, and a box or boxes having the highest scores (such as for example the two boxes having the $1^{st}$ and $2^{nd}$ highest calculated scores) may be automatically selected or determined as including a user's hand or hands—see, e.g., boxes 600A-D. Temporal corrections between subsequent images or frames in a video file may be applied, for example, by retaining or keeping the previous bounding box if its probability or score exceeds the scores of boxes detected in the current frame. This may ensure reliable hand detection despite varied video backgrounds. After detection, the bounding boxes may be processed by a neural network such as for example the convolutional OpenPose network, which may be used to extract hand joint landmarks, edges or points (see, e.g., elements 602A-B).

Some embodiments may detect or identify a user's dominant hand, or a dominant hand of the user. For example, some embodiments may track hand movements in visual data, and may analyze or determine patterns, such as the frequency or precision of actions performed by each hand. For instance, by observing which hand of a user is used more frequently or with greater dexterity for tasks like selecting virtual keys or pushing virtual buttons on a touch screen or interface, some embodiments may infer or determine the user's dominant hand. In some embodiments, machine learning models (see, e.g., nonlimiting examples herein) may be trained on gesture data and/or on a comprehensive dataset of movement data by a plurality of users, which may be labeled according to a given user's dominant hand, and may be used to classify dominant hands of new users.

A detected dominant hand of a user may be used as an attribute of the user and, for example, be stored as a binary variable such as, e.g., 'user_dom_hand'=0 (designating a dominant right hand) or 'user_dom_hand'=1 (designating a dominant left hand).

Some embodiments may detect motor attributes of a user using visual data, e.g., image or video frame data. For example, in some embodiments, a classification model may be used, for example, to differentiate between users having motor control attributes such as, e.g., having Parkinson's disease (PD) or other motor control conditions and restrictions, and users having no motor control issues. Attributes or features related to bradykinesia, including mean amplitude, amplitude standard deviation, speed, and fatigue, may be extracted from a set of images or video frames of hands during unilateral and bilateral motor tasks (such as for example pressing, tapping, or touching buttons or a touch screen or GUI). Machine learning models such as, e.g., neural networks and/or classifiers such as Logistic Regression, Gaussian Naive-Bayes, and Random Forest may be trained on comprehensive datasets including or describing these features or attributes and may be used for determining motor control attributes of users.

In some embodiments, PD or motor impairment may be detected, e.g., by a camera or cameras tracking the movement of participants performing motor tasks, e.g., according to a Gait analysis framework. For example, the system may capture a plurality of images or a video of patients tapping or touching a screen or GUI. Captured images or videos may be processed using computer vision techniques to extract motion data, including speed, amplitude, and coordination of hand movements. For instance, classification techniques and/or models (see, e.g., examples herein) may be trained using appropriate datasets and used to classify or distinguish between users having motor impairment or PD, and users having no motor issues. Additional or alternative detection procedures may be used in different embodiments.

A motor impairment of a user may be detected and used as an attribute of the user and, for example, be stored as a binary variable such as, e.g., 'motor_issues'=1 (designating, e.g., detected PD, tremors, and the like) or 'motor_issues'=0 (which may be a default value designating no detected motor issues).

Figure 7:
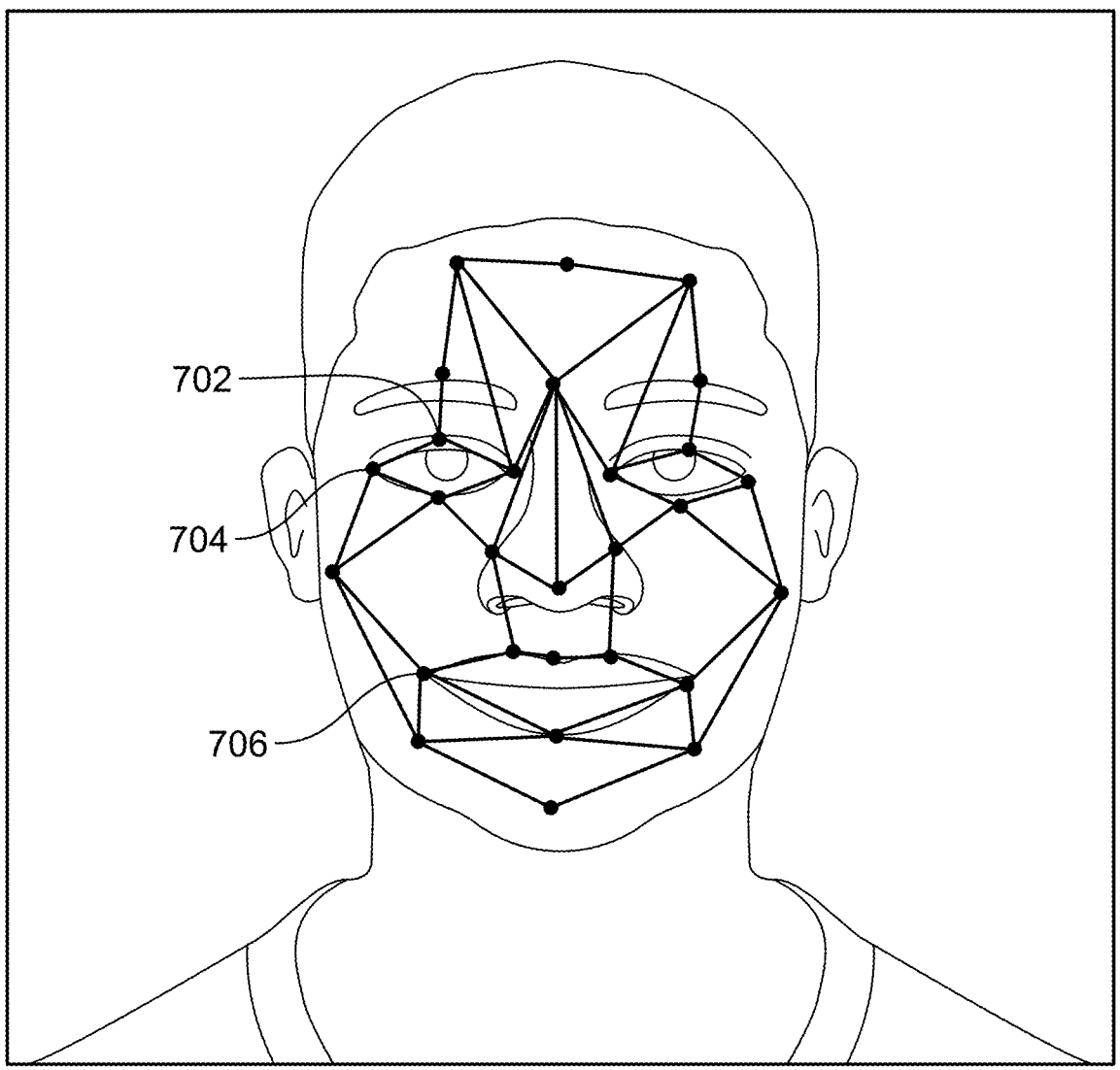
FIG. 7 illustrates an analysis of facial attributes according to some embodiments of the invention.

FIG. 7 illustrates an analysis of facial attributes according to some embodiments of the invention.

Some embodiments may detect a user's age using visual data, such as, e.g., image or video frame data. For example, some embodiments may detect or identify facial landmarks, points, or edges—such as for example locations of pupils 702, corners of eyes 704, lip boundaries 706, and the like—that may change as a person ages and may accordingly be used as age markers, features, or attributes. Some embodiments may analyze or classify detected or identified features, for example using a machine learning model or neural network (see, e.g., nonlimiting examples herein) which may be trained, e.g., using a labeled dataset of faces associated with ages or age values, to determine or estimate the age of a user having the detected or identified features.

A user's age detected and used as an attribute of the user and, for example, be stored as a variable such as, e.g., 'Age'=X (where X may be an integer).

Some embodiments may detect vision attributes (such as for example vision impairment for a user) using image or video frame data. For example, vision impairment may be detected in image or video frame data using computer vision and machine learning (see, e.g., nonlimiting examples herein) and by detecting and/or analyzing eye movements, facial cues, and responses to visual stimuli (such as for example graphical items or elements presented on a screen or GUI). Computer vision algorithms may be used to track eye gaze patterns, pupil dilation, and blink rates, and the like, which may differ significantly in individuals with impaired vision. Machine learning models trained on labeled datasets of individuals with and without vision impairments may be used to detect abnormal patterns, such as erratic or limited eye movements, which may be indicative of potential difficulties in perceiving objects, shapes, or colors, ultimately allowing for the detection, identification, and classification of various forms of vision impairment (such as for example color blindness, short sightedness, and the like).

A vision impairment of a user may be detected and used as an attribute of the user and, for example, be stored and/or used in a manner similar or analogous to detected motor impairment (e.g., using a binary variable).

Some embodiments may include using additional data sources and/or sensors for detecting or determining user attributes or features. For example, touch data (describing, for example, a location or locations on a touch screen where the user placed their finger) may be used as a source of information regarding the user's motor capabilities: in one nonlimiting use case, touch data describing tremors or repeating touches in multiple locations around the location of a button may indicate and/or be used for determining that a user has motor control issues (e.g., as an additional variable input to a model determining an arrangement of graphical elements).

Additional or alternative attributes or features, as well as attribute detection, identification or determination procedures and techniques may be used in different embodiments of the invention.

Based on detections of a person's or user's attributes, properties, or preferences, height, wheelchair usage, motor control, age, and the like (as detected in, e.g., visual data), some embodiments may determine an arrangement, organization, ordering, or rearrangement of graphical items or elements on the GUI based on detected data. Some embodiments may determine an arrangement and/or arrange graphical items or elements to provide the graphical items at a location or size accessible to the user, or at location or size appropriate or convenient for the user to use.

According to some embodiments, one nonlimiting example aspect or parameter that may be used in determining an arrangement of graphical elements may be, for example, a height for displaying a GUI or window within a screen or display.

Figure 8:
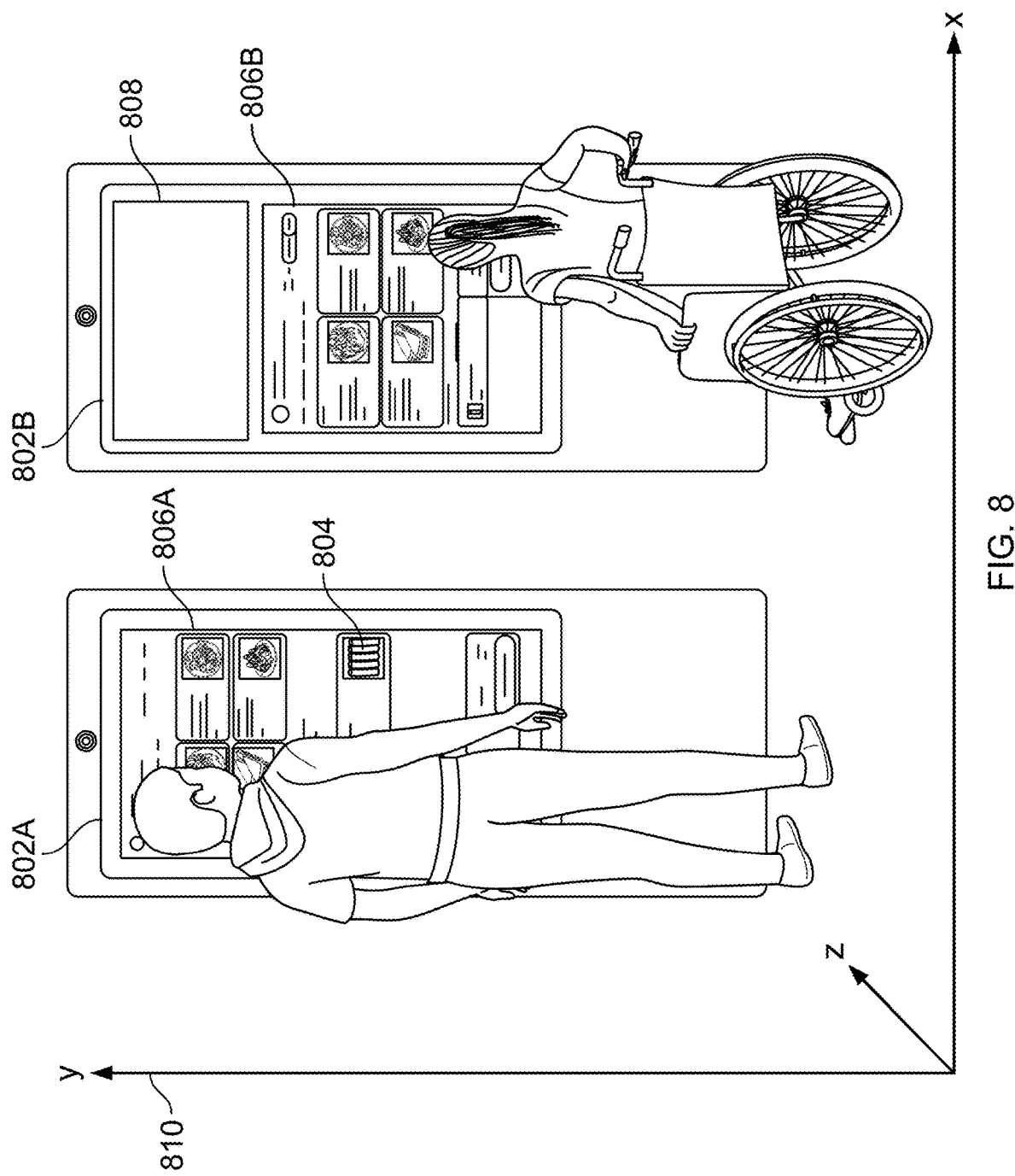
FIG. 8 shows an example display device according to some embodiments of the invention.

FIG. 8 shows an example display device according to some embodiments of the invention.

In some embodiments, the GUI is displayed on a vertically oriented monitor, the monitor being at least 60 centimeters long in a vertical dimension. Other dimensions may be used.

As used herein, a "vertically oriented monitor" may refer to a display screen or kiosk positioned such that its longest non-diagonal dimension (typically a vertical dimension) is aligned substantially perpendicular to the ground, with the screen's height being the typically longest dimension and extending in an upright direction relative to the user's standing position, for example as demonstrated in FIGS. 2, 3; the horizontal dimension may be the dimension parallel to the ground. In some embodiments, the height of the monitor or display, measured along its vertical dimension or axis 810 (e.g., the axis perpendicular to the ground), may be no less than 60 centimeters, ensuring that the screen's vertical size meets the minimum length required for usage by, e.g., both standing and sitting users (or users in a wheelchair). Additional or alternative dimensions may be used in different embodiments.

Some embodiments may include a physical or hardware component, such as for example a user interface, large touch screen, display, or kiosk 802A-B. Some embodiments may determine an arrangement and/or arrange, e.g., graphical elements or items 804 within user interface, touch screen or kiosk 802A-B, e.g., such that a user interface or window 806A may be arranged or placed at a height appropriate for a standing user or person (and, e.g., reaching or extending to the top or upper side of screen 802A)—or such that, e.g., a user interface or window 806B may be arranged or placed at a height appropriate for or accessible to a user sitting in or restricted to a wheelchair (and, e.g., reaching or extending to ⅔ of the height of screen 802B, where a top part 808 amounting, e.g., to ⅓ of the screen may not display elements and may remain blank). Additional or alternative arrangements may be used in different embodiments.

In some embodiments, one or more of: the detecting of the one or more attributes, and the arranging of the one or more graphical elements is performed when the user approaches the GUI.

For example, a detection of a user approaching the GUI may be performed using object detection techniques including, e.g., a use of reference or background images for movement detection, and/or height or distance detection (see nonlimiting examples herein). Some embodiments may accordingly detect, identify, or measure attributes or features or a user once the user has approached the GUI, display, or kiosk—which may be defined, for example, using a minimum distance criterion (for example, the user may be required to be within 0.5 meters from the display or GUI to initiate the calculation, computation or determining of user's attributes). A distance criterion or definition may ensure, for example, standardization of visual data used for calculating user attributes or features (such that, e.g., attributes may not be calculated based on poor resolution visual data, in which the user may be too far from the camera), which may help minimize errors in attribute of feature detection. Additional or alternative user approach conditions and/or definitions may be used in different embodiments.

In some embodiments, a decision or a determination of an arrangement or placement of graphical elements or items 804 within a screen, display, or GUI may be made when a person or user approaches the physical kiosk or display, or when a user approaching the kiosk is detected. As demonstrated in FIG. 8, and as part of placing, arranging, or rearranging graphical elements or items 804—some embodiments may not require physically or mechanically moving the user interface, kiosk or screen 802A-B: some embodiments may use only parts of the screen or kiosk which may be accessible for the relevant user, and not use a part or parts of the screen 808 which may be inaccessible to a given user (such as for example a higher part or region of the screen that may not be accessible or reachable to a person in a wheelchair). Accordingly, some embodiments may provide the technical advantages or improvements of not requiring technical or physical maintenance for a moving mechanical part or component, and/or requiring less power or energy (such as, e.g., electricity consumption) for their operations compared to technologies requiring moving physical or mechanical parts or components.

Some embodiments may include arranging one or more graphical elements within a graphical user interface (GUI) based on one or more of the detected attributes. In some embodiments, arranging of the one or more graphical elements comprises determining one or more of: a size within the GUI for one or more of the elements, and a location within the GUI for one or more of the elements.

For example, some embodiments of the invention may arrange graphical elements or items using a dedicated algorithm that may, e.g., use or consider a user's height (for example if the user is in a wheelchair) to determine a placement or a height for the GUI as a whole, and/or locations of graphical items or elements within the display or GUI—and that may use the user's motor control (e.g., PD) to compute or determine the size of graphical elements (such as, e.g., buttons) within the GUI. For example, some embodiments may compute or determine an arrangement of organization of graphical elements based on a rule system and/or computer logic. An example rule system for nonlimiting example use cases relating to determining the height for a window or GUI is provided in Table 1.

TABLE 1 if (user_height>60 inches) AND (user_motor_issues=false) AND (user_age<70) → set GUI_height=user_height-(20 inches) AND set GUI_location=center AND set GUI_button_size=standard;
    if (user_height>60 inches), AND (user_motor_issues=true) → set GUI_height=user_height-(20 inches) AND set GUI_location=center AND set GUI_button_size=large;
    If (user_wheelchair=true) AND (user_motor_issues=false) AND (user_age<70) → set GUI_height=user_height-(35 inches) AND set GUI_location=center AND set GUI_button_size=standard;
    If (user_wheelchair=true) AND (user_motor_issues=true) AND (user_age>70) → set GUI_height=user_height-(35 inches) AND set GUI_location=center AND set GUI_button_size=large.

Where, for example, a standard button size in the display or GUI may range from 1.5 to 2.5 cm (wide/x-axis) and 1 to 1.5 cm (tall/y-axis), and a large button size may range from 3 to 5 cm (wide/x-axis) and 2 to 3 cm (tall/y-axis), providing larger targets for easier interaction and reducing the need for precise movements. Other dimensions may be used.

Additional or alternative rules, conditions, and logical flows may be used in different embodiments.

Some embodiments of the invention may determine an arrangement and/or arrange one or more graphical elements within a GUI using an multi-step algorithm. Example algorithms according to some embodiments may include, for example, the following operations:

Operation 1: determine or calculate the attributes of the user.

Operation 2: determine the placement of the kiosk or GUI (such as, e.g., the height at which the entire GUI or window may be placed).

Operation 3: determine additional attributes of the kiosk (such as, e.g., button size, luminosity or brightness, and the like).

For example, in operation 1 attributes of the user such as for example:

Height (decimal or floating point number)

Wheelchair (binary, yes/no)

Fine motor issues (which may be for example a discrete variable having values of, e.g., 0, 1, 2, . . . and designating "no motor issues", "minor issues", "more severe issues" . . . and the like).

Age>70 (binary, yes, no)

Age<6 (binary, yes, no)

Preferred/dominant side (discrete: none, left, right).

Blind (discrete: yes, no, sight impairment)

may be determined or calculated.

A pseudocode for a rule based nonlimiting example algorithm for operation 2 according to some embodiments is provided in Table 2:

TABLE 2

```
If (user_is_blind or (user_age<6))
   If the user is blind call assistance
   If user_age<6 ignore
Else If User_is_in_wheel chair
   Place center of screen at user_height - 20 centimeters
Else If (user_height > minimal height) and (user_height < maximal height)
   Place center of screen at user_height - 40 centimeters
Else if user height >= maximal height
   Place center of screen at maximum possible height (e.g. 180 centimeters for
example)
Else if user height <= minimum height
   Place center of screen at minimum possible height (e.g. 95 centimeters for example)
```

Pseudocode for a rule based nonlimiting example algorithm for operation 3 according to some embodiments is provided in Table 3:

TABLE 3

```
If user has sight_impairment
   Increase screen luminosity or brighten background, choose high luminosity settings
   Set Button_Size=large
Else if user has motor issues OR age>70
   Set Button_Size=large
Else use default attributes
```

Additional or alternative rule based flows may be used in different embodiments.

In some embodiments the arranging of the one or more graphical elements comprises determining, by a supervised machine learning algorithm, an arrangement for the one or more graphical elements, wherein the supervised machine learning algorithm comprises training a machine learning model using a dataset mapping attributes to placement values.

For example, operation 2 and/or 3 may include or may be performed using supervised machine learning models, algorithms and techniques. A comprehensive training dataset including, e.g., thousands of data points or samples may be established, where each data point includes a plurality of attribute or feature values describing a single person or user, as well as a preferred height and/or an associated placement manually selected by the relevant user (for example, each user may manually select the height or position for the center of the kiosk or GUI, and the user's selection may be recorded in a database along with additional attribute or feature values). In the training dataset, user attributes or feature values may be mapped to height or position values of graphical elements as manually chosen or selected by the user. Using a supervised learning algorithm or approach, a machine learning model such as for example a function-based multivariate regression model and/or a deep neural network may be trained using the dataset to output, predict, or determine an arrangement or placement for relevant graphical elements or items, including for example, height and/or placement values (e.g., placing element A at pixel X,Y; setting "button size" to small/large, and the like), given input attribute or feature values which may be measured for a user approaching the kiosk.

An example training dataset mapping/associating attributes or features to/with arrangement or placement values or parameters according to some embodiments may have the form illustrated in Table 4:

TABLE 4

|  | Height | Motor Control | Age | Sight | ... | GUI height | Button size |
|---|---|---|---|---|---|---|---|
| User A | 1.78 meters | 0 (no motor issues) | 46 | 0 (no sight impairment) | ... | 1.68 meters | small |
| User B | 1.50 meters | 1 (minor motor impairment) | 86 | 1 (minor sight impairment) | ... | 1.40 meters | large |
| ... | ... | ... | ... | ... |  | ... ... | ... |

Additional or alternative dataset or database forms or formats may be used in different embodiments.

In some embodiments, a machine learning model used in operation 2 and/or 3 may be continuously trained, retrained, or calibrated to improve the determining, outputting or predicting of arrangements or placements for graphical elements or items, or the mapping/associations of newly measured attributes to height/placement values. For example, throughout the use of the kiosk or GUI, newly measured attribute or feature values and placement parameters (e.g., height of GUI in centimeters, button size, etc.), and/or actions or operations performed by the user using the GUI, may be stored or be accumulated in the training dataset, and periodic model training iterations (e.g., once a week, or once in a configurable time period) may be performed to improve the model's performance. In an example case where a user's attribute or feature value does not allow or causes an issue with outputting, determining, or predicting GUI placement parameters by the model (for example, if a height value detected for a given user is significantly below all height values recorded in the training set), some embodiments may allow the user to manually select placement preferences and parameters (e.g., using a dedicated menu within the GUI) and may store the newly measured or newly determined attribute values in the training set, to be used in future training iterations (for example to recalculate coefficient values in a regression model or neural weights in a neural network).

For determining or calculating arrangements or placements of graphical elements based on a training set of user attributes, some embodiments may use, for example, random forest or gradient boosting machine (GBM) algorithms and techniques, e.g., to capture non-linear relationships between user attributes or features such as, e.g., height, motor capabilities, and vision quality, and to map captured relationships to specific layout configurations (such as, e.g., GUI or window height, button size, and the like). Reinforcement learning (e.g., Q-learning or policy gradient) may be used in some embodiments to optimize layouts through user feedback in real-time, learning via rewards based on interaction metrics. In some embodiments, a variational autoencoder (VAE) or generative adversarial network (GAN) may be used to learn and determine or compute different arrangements, and/or to generate novel arrangements for newly detected attributes or features. Additional or alternative machine learning models and/or techniques may be used in different embodiments.

Some embodiments may include a combination of rule based and/or machine learning techniques for performing GUI element placement or arrangement determinations.

Figure 9:
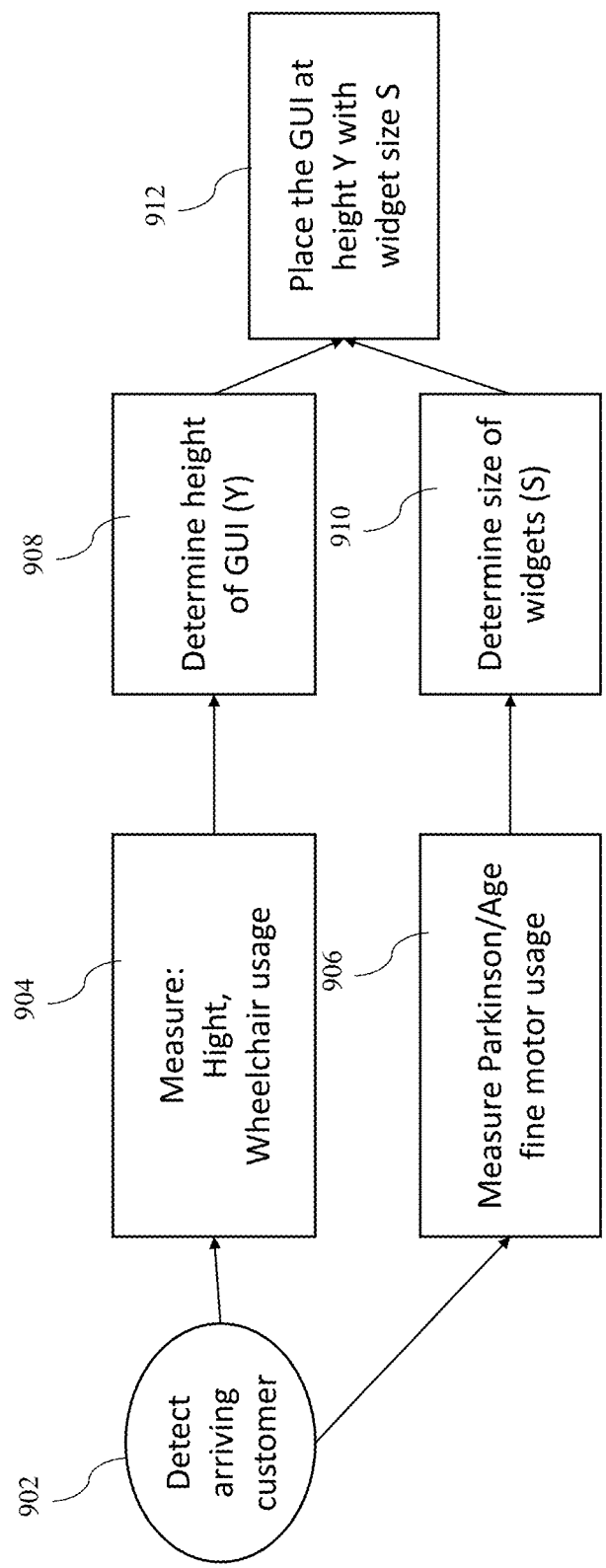
FIG. 9 shows an example algorithm for determining graphical user interface (GUI) height and widget size within a display according to some embodiments of the invention.

FIG. 9 shows an example algorithm for determining graphical user interface (GUI) height and widget size within a display according to some embodiments of the invention.

Upon detecting an arriving customer or user approaching the screen or kiosk 902, some embodiments may measure, e.g., in image or video data as received from a camera or plurality of cameras, user attributes such as for example the height of the user and/or whether the user is in a wheelchair (operations 904) and/or the age of the user and/or the user's fine motor control, e.g., to detect a motor control impairment such as for example Parkinsons's disease (operations 906). In some embodiments of the invention detecting or determining user properties (such as, e.g., operations 904, 906) may be performed concurrently or in parallel. Some embodiments may determine a height Y or other positional metric for the placement or arrangement of a GUI within the kiosk or physical screen based on the measured user's height and/or whether the user is in a wheelchair (operation 908), and/or determine a size S for widgets inside the GUI based on the measured user's motor control and/or age attributes (operation 910). Embodiments may then place the GUI based on the determined values for Y and S, e.g., such that the GUI is placed at height Y and includes widgets of size S (operation 912). Additional or alternative operations may be used in different embodiments.

Figure 10:
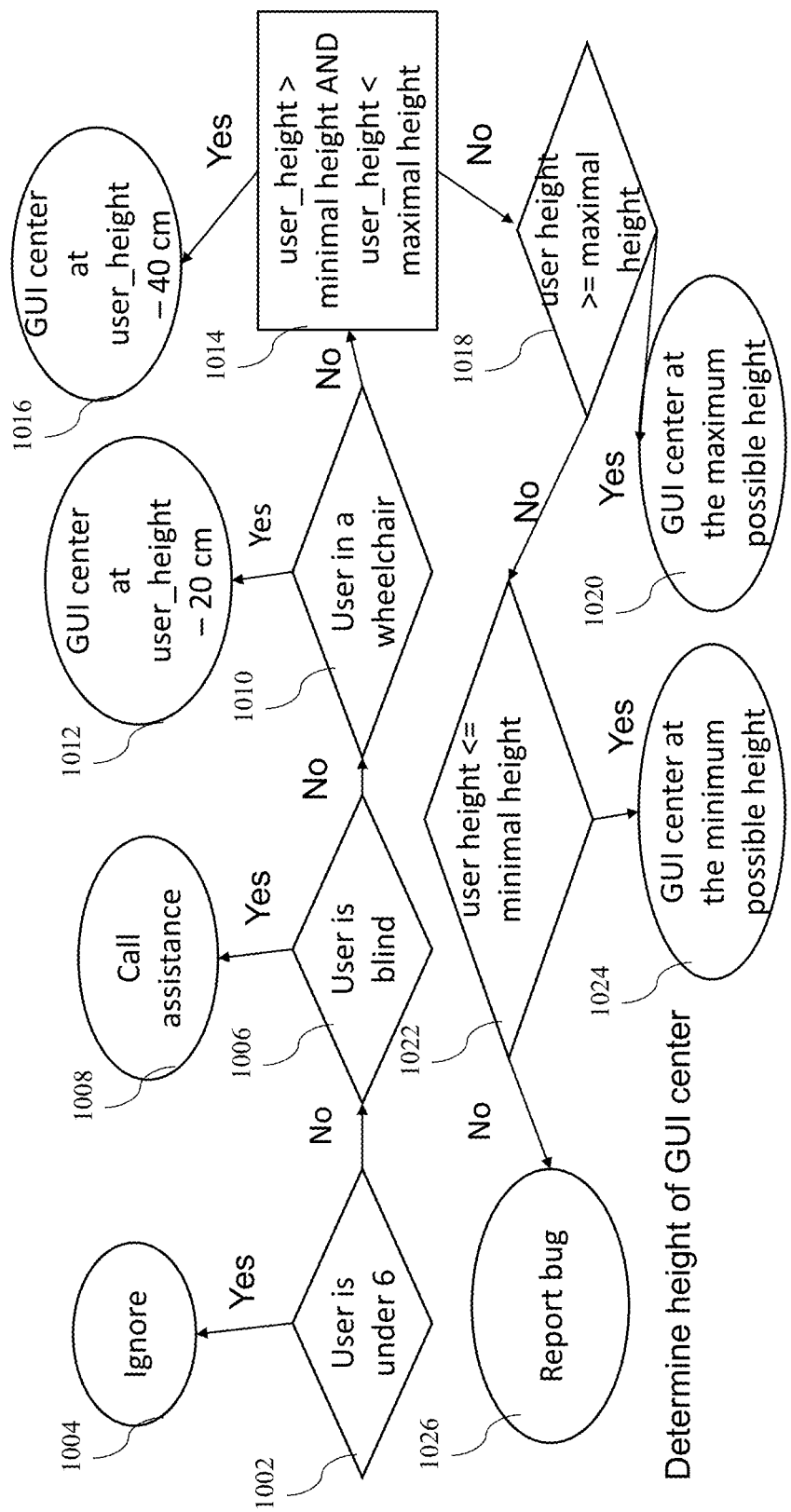
FIG. 10 shows an example algorithm for determining a height for a graphical user interface according to some embodiments of the invention.

FIG. 10 shows an example algorithm for determining a height for a graphical user interface according to some embodiments of the invention.

For example, after measuring the height of a user approaching the kiosk or screen, some embodiments may determine the age of the user, and if the user is under a certain threshold age (e.g. 6 years old) (operation 1002) some embodiments may for example ignore the user and not display, or prevent displaying a GUI to the user (operation 1004). Otherwise, if the user is over the threshold (e.g. 6 years old), some embodiments may determine whether the user has a first disability, such as is blind (e.g., by analyzing eye movement or motor control in image or video data; operation 1006). If so, some embodiments may call assistance, such as, e.g., a human representative that may assist the user to operate the GUI (operation 1008). Otherwise, some embodiments may determine whether the user has a second disability, e.g. is in a wheelchair (e.g., based on object recognition in image or video data; operation 1010). If so, some embodiments may alter the GUI per the second disability. For example, an embodiment may move the GUI center lower, in the case the second disability determines the user is at a lower height, or at a height convenient for a sitting user, e.g. place the GUI center—or the center of the upper vertex of a GUI such as, e.g., element 806B—20 centimeters below the measured user height (operation 1012), e.g., to match the eye level of the user. Otherwise, some embodiments may check if the measured user's height is larger than a minimum threshold value T1 and smaller than a maximum threshold value T2 (operation 1014). If so, some embodiments may place the GUI center 40 centimeters below the measured user height (operation 1016). Otherwise, some embodiments may determine whether the measured user's height is higher than maximum threshold value T2 (operation 1018), and if so, move the GUI center higher on the display, e.g. place the GUI center at the maximal possible height or at height T2 (operation 1020). Otherwise, some embodiments may determine if the user's height is shorter than minimum threshold value T1(operation 1022), and if so, place the GUI center at a lower or the minimal possible height T1 (operation 1024). Finally, if it is determined that the user's height is shorter than T1 in operation XX, some embodiments may send an error message or report a bug in determining the height for the GUI (operation 1026). Additional or alternative operations may be included in different embodiments.

Figure 11:
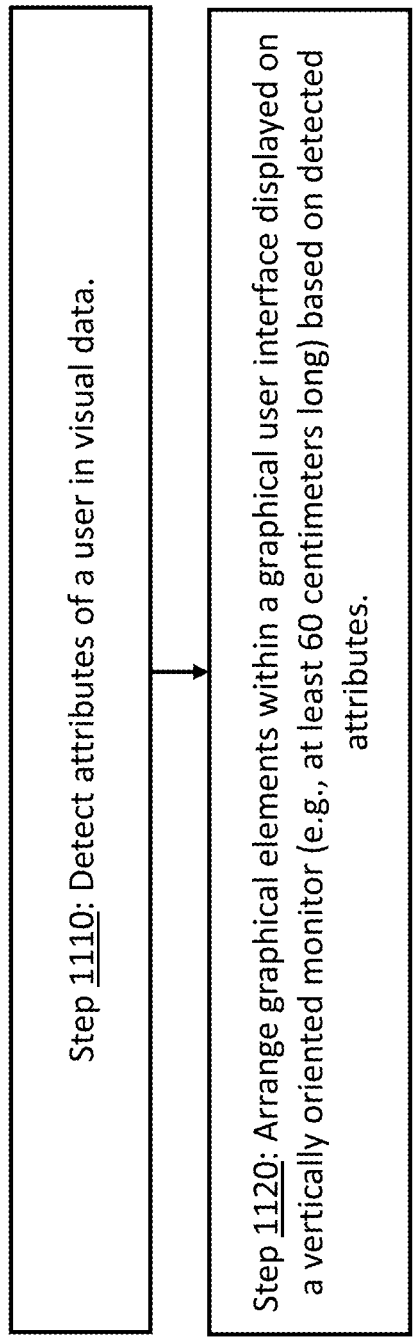
FIG. 11 is a flowchart of an example method for arranging computerized graphical elements on a user interface according to some embodiments of the invention.

FIG. 11 is a flowchart of an example method for arranging computerized graphical elements on a user interface according to some embodiments of the invention. In operation 1110, some embodiments may detect one or more attributes of a user in visual data (such as for example the user's height, dominant hand, motor ability, whether the user is in a wheelchair, and the like). Some embodiments may arrange graphical elements within a user interface or GUI based on detected attributes (for example, for a standing user, graphical elements may be placed at a default or normal height—and for an ambulatory user or user in a wheelchair, graphical elements may be placed at a lower height, operation 1120; see also additional nonlimiting examples relating to determining graphical element size based a detected motor ability for a user, and the like). In some embodiments, the GUI may be displayed on a vertically oriented monitor being at least 60 centimeters long in a vertical dimension or along a vertical axis 810 (see, e.g., nonlimiting illustration in FIG. 8). Additional or alternative operations and/or dimensions may be used in different embodiments.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for arranging computerized graphical elements on a user interface comprising, using one or more computer processors:
    detecting one or more attributes of a user in visual data, wherein the one or more attributes comprise: a dominant hand of the user, and whether the user is in a wheelchair; and
    arranging a graphical user interface (GUI) comprising one or more graphical elements based on one or more of the detected attributes,
    wherein the arranging of the GUI comprises determining, by a supervised machine learning algorithm, a placement for the one or more graphical elements, wherein the supervised machine learning algorithm comprises training a machine learning model using a dataset mapping user attributes to placement parameters, the placement parameters describing a placement within the GUI,
    wherein the arranging of the GUI comprises determining a placement for the GUI as a whole, wherein the GUI is displayed on a vertically oriented monitor, the monitor being at least 60 centimeters long in a vertical dimension, and
    wherein the arranging of the GUI is performed without displacing the vertically oriented monitor.

2. The method of claim 1, wherein the attributes describe an interaction of the user with the GUI.

3. The method of claim 1, wherein the one or more attributes comprise: a height of the user, and a motor ability of the user.

4. The method of claim 1, wherein the arranging of the GUI comprises determining one or more of: a size within the GUI for one or more of the graphical elements, and a location within the GUI for one or more of the graphical elements.

5. The method of claim 1, wherein one or more of: the detecting of the one or more attributes, and the arranging of the GUI is performed when the user approaches the GUI.

6. The method of claim 1, wherein the arranging of the GUI is performed without displacing a display element comprising the GUI.

7. The method of claim 1, wherein the arranging of the GUI comprises determining, by a supervised machine learning algorithm, an arrangement for the one or more graphical elements.

8. A computerized system for arranging graphical elements on a user interface comprising:
    a vertically oriented monitor, the monitor being at least 60 centimeters long in a vertical dimension;
    a memory; and
    one or more processors configured to:
    detect one or more attributes of a user in visual data, wherein the one or more attributes comprise: a dominant hand of the user, and whether the user is in a wheelchair; and
    arrange a graphical user interface (GUI) comprising one or more graphical elements based on one or more of the detected attributes,
    wherein the arranging of the GUI comprises determining, by a supervised machine learning algorithm, a placement for the one or more graphical elements, wherein the supervised machine learning algorithm comprises training a machine learning model using a dataset mapping user attributes to placement parameters, the placement parameters describing a placement within the GUI,
    wherein the arranging of the GUI comprises determining a placement for the GUI as a whole, wherein the GUI is displayed on the vertically oriented monitor, and
    wherein the arranging of the GUI is performed without displacing the vertically oriented monitor.

9. The system of claim 8, wherein the attributes describe an interaction of the user with the GUI.

10. The system of claim 8, wherein the one or more attributes comprise: a height of the user, and a motor ability of the user.

11. The system of claim 8, wherein the arranging of the GUI comprises determining one or more of: a size within the GUI for one or more of the graphical elements, and a location within the GUI for one or more of the graphical elements.

12. The system of claim 8, wherein one or more of: the detecting of the one or more attributes, and the arranging of the GUI is performed when the user approaches the GUI.

13. The system of claim 8, wherein the arranging of the GUI is performed without displacing a display element comprising the GUI.

14. The system of claim 8, wherein the arranging of the GUI comprises determining, by a supervised machine learning algorithm, an arrangement for the one or more graphical elements.

15. A method for arranging computerized graphical items on a display comprising, using one or more computer processors:
    measuring one or more features of a user in image data, wherein the one or more features comprise: a dominant hand of the user, and whether the user is in a wheelchair; and
    placing a graphical user interface (GUI) comprising one or more graphical items within a display based on one or more of the measured features,
    wherein the placing of the GUI comprises determining, by a supervised machine learning algorithm, a placement for the one or more graphical elements, wherein the supervised machine learning algorithm comprises training a machine learning model using a dataset associating features with placement values, the placement values describing a placement within the GUI, wherein the placing of the GUI comprises determining a placement for the GUI as a whole, wherein the display comprises a vertically oriented screen, the screen being at least 60 centimeters long in a vertical dimension, and wherein the placing of the GUI is performed without displacing the display.

16. The method of claim 15, wherein one or more of the features describe an interaction of the user with the display.

17. The method of claim 15, wherein the placing of the GUI comprises computing one or more of: a size within the display for one or more of the graphical items, and a location within the display for one or more of the graphical items.

18. The method of claim 15, wherein one or more of: the measuring of the one or more features, and the placing of the GUI is performed when the user approaches the display.

19. The method of claim 15, wherein the placing of the GUI is performed without displacing a display element comprising the GUI.

20. The method of claim 15, wherein the placing of the GUI comprises determining, by the machine learning model, the placement for the one or more graphical items.

* * * * *